(12) United States Patent
Amirkiai et al.

(10) Patent No.: US 9,804,349 B2
(45) Date of Patent: Oct. 31, 2017

(54) MULTI-LENS OPTICAL COMPONENTS

(71) Applicant: FINISAR CORPORATION, Sunnyvale, CA (US)

(72) Inventors: Maziar Amirkiai, Sunnyvale, CA (US); Tao Wu, Union City, CA (US); Mark Donovan, Mountain View, CA (US); Hongyu Deng, Saratoga, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/881,693

(22) Filed: Oct. 13, 2015

(65) Prior Publication Data

US 2016/0047997 A1    Feb. 18, 2016

Related U.S. Application Data

(63) Continuation of application No. 14/824,883, filed on Aug. 12, 2015.

(60) Provisional application No. 62/036,714, filed on Aug. 13, 2014, provisional application No. 62/039,758, filed on Aug. 20, 2014, provisional application No. 62/063,225, filed on Oct. 13, 2014, provisional application No. 62/069,707, filed on Oct. 28, 2014,
(Continued)

(51) Int. Cl.
  *G02B 6/42* (2006.01)
(52) U.S. Cl.
  CPC ......... *G02B 6/4251* (2013.01); *G02B 6/4248* (2013.01); *G02B 6/4249* (2013.01); *G02B 6/4204* (2013.01); *G02B 6/4208* (2013.01); *G02B 6/4292* (2013.01)

(58) Field of Classification Search
None
See application file for complete search history.

(56) References Cited

U.S. PATENT DOCUMENTS

| 6,821,028 B2* | 11/2004 | Morris | G02B 6/4292 |
| | | | 385/49 |
| 7,137,746 B2* | 11/2006 | Kato | G02B 6/4204 |
| | | | 385/88 |

(Continued)

FOREIGN PATENT DOCUMENTS

| JP | 2006-054366 A | 2/2006 |
| JP | 2007-271882 A | 10/2007 |

OTHER PUBLICATIONS

International Search Report and Written Opinion mailed Dec. 23, 2015 in related PCT Application No. PCT/US2015/055375 (13 pages).

(Continued)

*Primary Examiner* — Tina Wong
(74) *Attorney, Agent, or Firm* — Maschoff Brennan

(57) ABSTRACT

This disclosure generally relates to high-speed fiber optic networks that use light signals to transmit data over a network. The disclosed subject matter includes devices and methods relating to multi-lens optical components and/or optoelectronic subassemblies. In some aspects, devices and methods relate to an optical component including a housing defining a cavity and a lens array having a plurality of lenses on an optically transmissive portion of the housing. In some aspects, devices and methods relate to an optical component including a substrate; and a lens array on the substrate, the lens array having a plurality of discrete lenses.

16 Claims, 7 Drawing Sheets

Related U.S. Application Data provisional application No. 62/069,710, filed on Oct. 28, 2014, provisional application No. 62/069,712, filed on Oct. 28, 2014.

(56) References Cited

U.S. PATENT DOCUMENTS

| | | | |
|---|---|---|---|
| 7,324,716 B2 * | 1/2008 | Epitaux | G02B 6/4204 385/14 |
| 7,720,337 B2 * | 5/2010 | Lu | G02B 6/4231 385/52 |
| 8,641,299 B2 * | 2/2014 | Daikuhara | G02B 6/4204 385/93 |
| 9,014,519 B2 * | 4/2015 | Mathai | G02B 6/423 385/14 |
| 2001/0024551 A1 | 9/2001 | Yonemura et al. | |
| 2001/0051026 A1 | 12/2001 | Steinberg et al. | |
| 2004/0264884 A1 | 12/2004 | Liu | |
| 2007/0267569 A1 * | 11/2007 | Ueno | G02B 6/423 250/216 |
| 2009/0202203 A1 * | 8/2009 | Budd | G02B 6/30 385/33 |
| 2013/0279860 A1 | 10/2013 | Hung et al. | |
| 2014/0205246 A1 | 7/2014 | Li et al. | |

OTHER PUBLICATIONS

International Search Report and Written Opinion for PCT Application No. PCT/US2015/057883 mailed Dec. 23, 2015.

\* cited by examiner

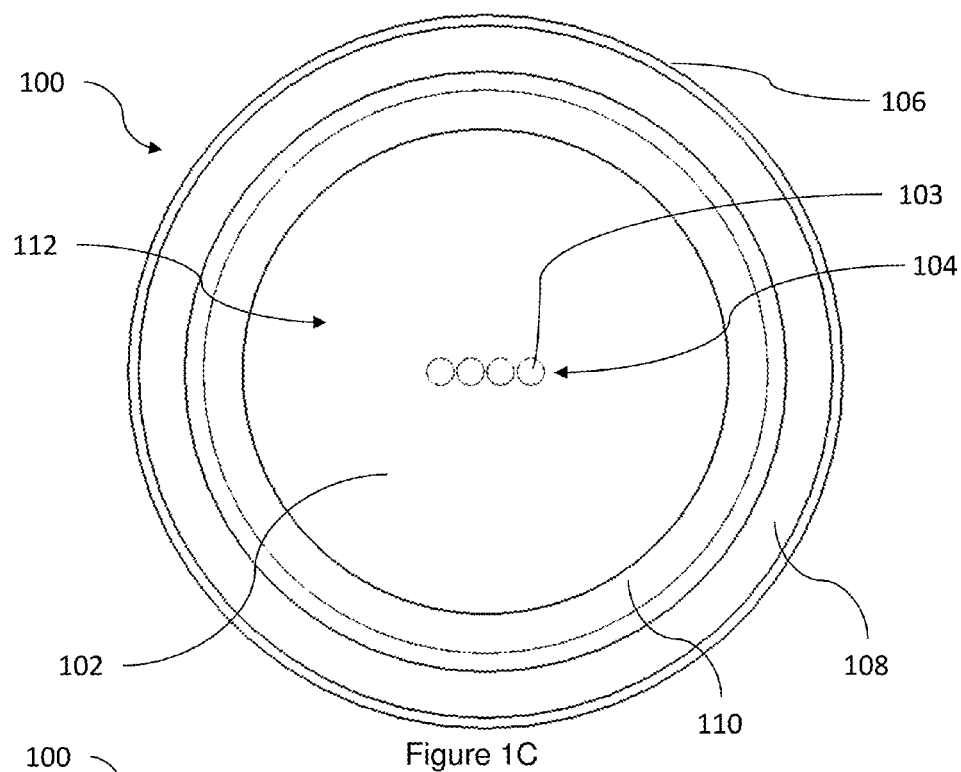
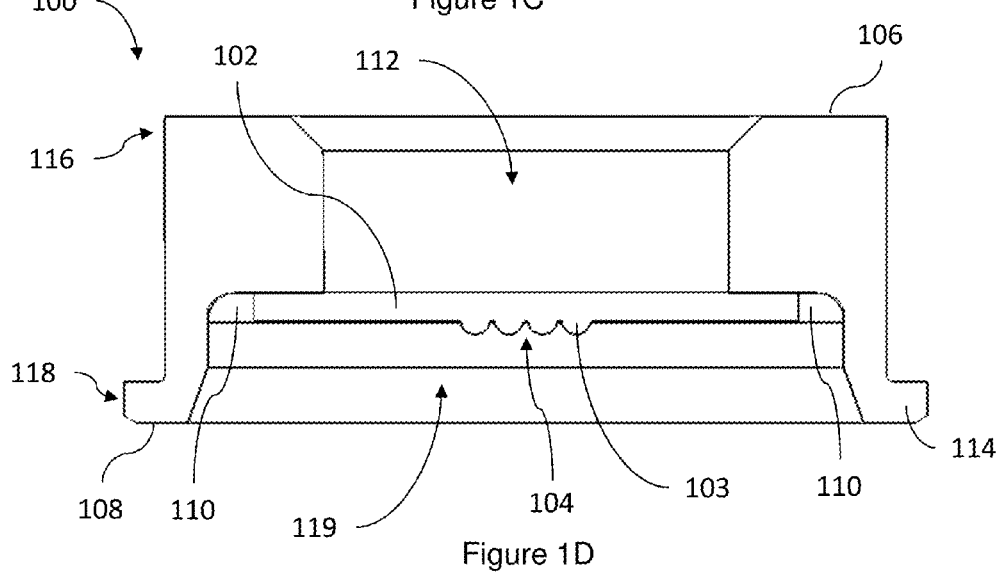

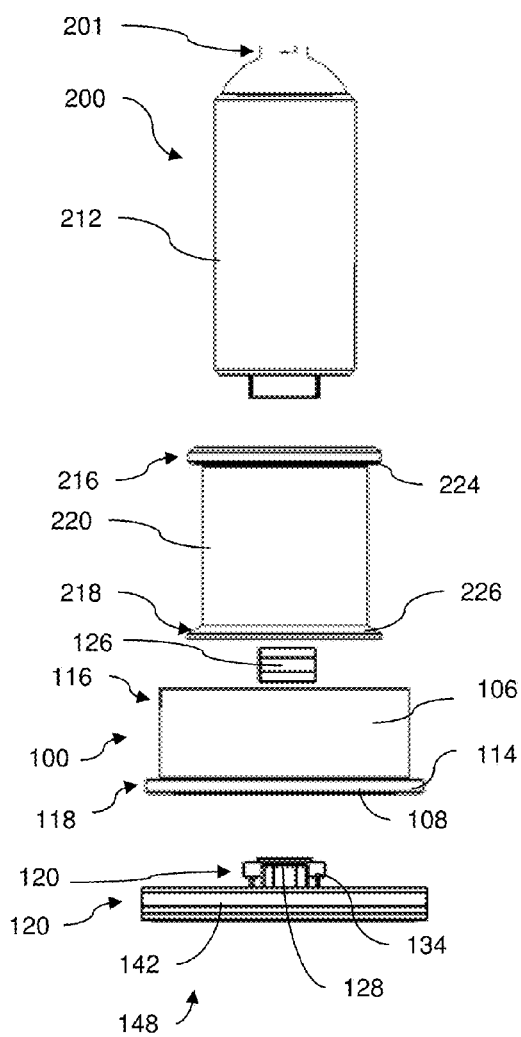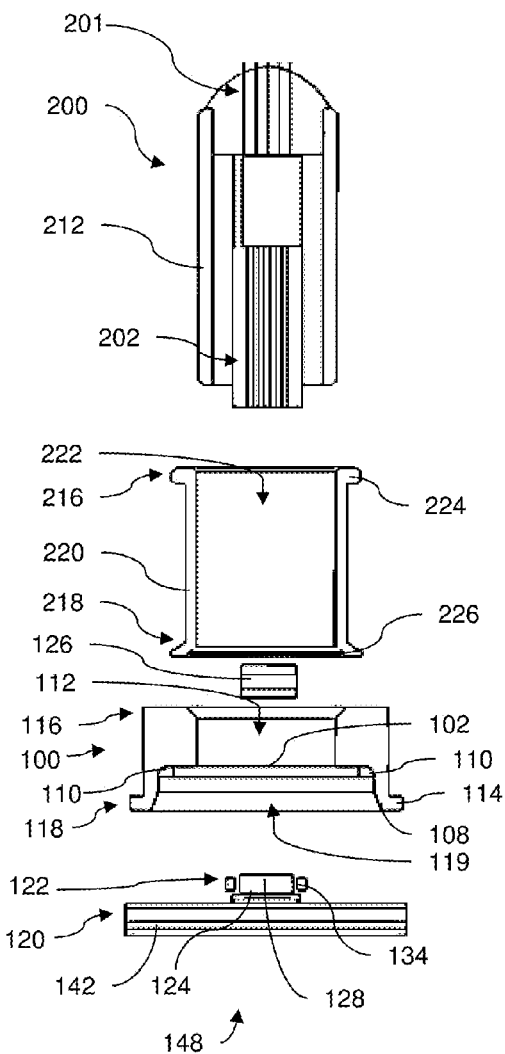
Figure 4A                               Figure 4B

MULTI-LENS OPTICAL COMPONENTS

CROSS-REFERENCE TO RELATED APPLICATIONS

This application is a continuation of patent application Ser. No. 14/824,883, filed Aug. 12, 2015, entitled FERRULE ASSEMBLIES, which claims priority to U.S. Provisional Application 62/036,714, filed Aug. 13, 2014, entitled FERRULE ASSEMBLIES, U.S. Provisional Application 62/039,758, filed Aug. 20, 2014, entitled LENS RECEPTACLES, U.S. Provisional Application 62/063,225, filed Oct. 13, 2014, entitled MULTI-LENS OPTICAL COMPONENTS, U.S. Provisional Application 62/069,707 filed Oct. 28, 2014, entitled MULTI-CHANNEL OPTOELECTRONIC SUBASSEMBLIES, U.S. Provisional Application 62/069,710 filed Oct. 28, 2014, entitled MULTI-LAYER SUBSTRATES, and U.S. Provisional Application 62/069,712 filed Oct. 28, 2014, entitled SUBSTRATES INCLUDING OPTOELECTRONIC COMPONENTS; which are all incorporated by reference herein in their entirety.

BACKGROUND

The present disclosure relates to high-speed fiber optic networks that use light signals to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

The claimed subject matter is not limited to configurations that solve any disadvantages or that operate only in environments such as those described above. This background is only provided to illustrate examples of where the present disclosure may be utilized.

SUMMARY

In one example, an optical component includes a housing defining a cavity and a lens array having a plurality of lenses on an optically transmissive portion of the housing.

In another example, an optical component includes a substrate; and a lens array on the substrate, the lens array having a plurality of discrete lenses.

In yet another example, an optoelectronic subassembly includes: a multi-channel header subassembly with a substrate and optoelectronic components on the substrate, the optoelectronic components configured to transmit and/or receive optical signals; and an optical component with a housing defining a cavity and a lens array having a plurality of lenses on an optically transmissive portion of the housing.

In yet another example, a method includes: providing an optical component including a housing defining a cavity and a lens array having a plurality of lenses on an optically transmissive portion of the housing.

This Summary is provided to introduce a selection of concepts in a simplified form that are further described below in the Detailed Description. This Summary is not intended to identify key features or essential characteristics of the disclosed subject matter, nor is it intended to be used as an aid in determining the scope of the claims. Additional features and advantages will be set forth in the description which follows, and in part will be obvious from the description, or may be learned by practice.

BRIEF DESCRIPTION OF THE DRAWINGS

FIG. 1C is a bottom view of the optical component of FIG. 1A.

FIG. 1D is a side cross-sectional view of the optical component of FIG. 1A.

FIG. 4A is an exploded side view of the optoelectronic subassembly of FIG. 3A.

FIG. 4B is an exploded side cross-sectional view of the optoelectronic subassembly of FIG. 3A.

DETAILED DESCRIPTION

Figure 1A:
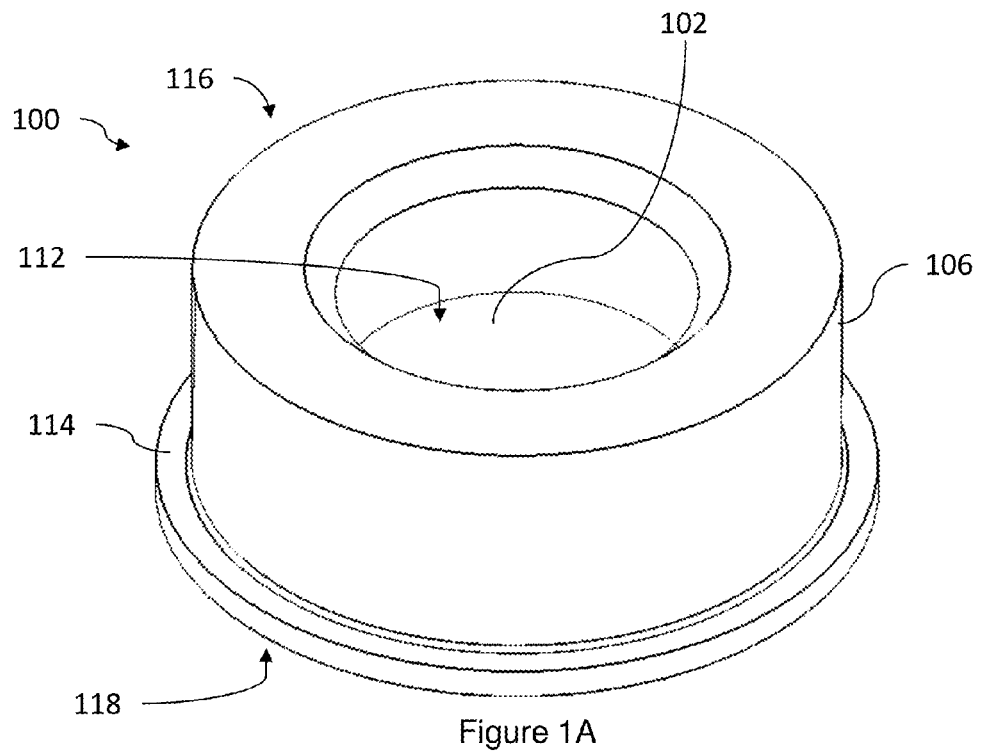
FIG. 1A is a top perspective view of an example optical component.

Reference will be made to the drawings and specific language will be used to describe various aspects of the disclosure. Using the drawings and description in this manner should not be construed as limiting its scope. Additional aspects may become obvious in light of the disclosure, including the claims, or may be learned by practice.

The terms and words used in the following description and claims are not limited to the bibliographical meanings, but are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The term "optoelectronic subassembly" may be used to refer to any portion of an optoelectronic assembly. However, at times this disclosure may use "optoelectronic subassembly" to refer to specific portions of an optoelectronic assembly, as may be indicated by context.

High-speed fiber optic networks use light signals (which may also be referred to as optical signals) to transmit data over a network. Fiber optic networks have various advantages over other types of networks such as copper wire based networks. Many existing copper wire networks operate at near maximum possible data transmission rates and at near maximum possible distances for copper wire technology. Fiber optic networks are able to reliably transmit data at higher rates over further distances than is possible with copper wire networks.

Although fiber optic networks use light signals to carry data, many electronic devices such as computers and other network devices use electrical signals. Accordingly, optoelectronic assemblies may be used to convert electrical signals to optical signals, convert optical signals to electrical signals, or convert both electrical signals to optical signals and optical signals to electrical signals.

Optoelectronic assemblies may include optoelectronic subassemblies ("OSAs"), such as receiver optoelectronic subassemblies ("ROSAs"), transmitter optoelectronic subassemblies ("TOSAs"), or both. A ROSA receives light signals with a light detector such as a photodiode and converts light signals into electrical signals. A TOSA receives electrical signals and transmits corresponding light signals. A TOSA may include an optical transmitter such as a laser that generates light that is transmitted to a fiber optic network. Optoelectronic assemblies or subassemblies may include various components such as optical components and/or electronic components.

Optoelectronic assemblies or subassemblies may include various components such as optical components and/or electronic components. Optical components involve optical signals and may, for example, emit, receive, transmit, carry, focus, and/or collimate optical signals. Electrical components involve electrical signals may, for example, receive, transmit, carry, transduce, transform, modulate, and/or amplify electronic signals. Optoelectronic components may involve both electrical and optical signals, and may be referred to as transducer components. Optoelectronic components may change optical signals to electrical signals and/or change electrical signals to optical signals (e.g., diodes or lasers).

Some optoelectronic assemblies may include multiple channels ("multi-channel optoelectronic assemblies"), with each channel corresponding to a set of one or more optical signals travelling through an optical fiber. Multi-channel optoelectronic assemblies may support increased data transfer rates through fiber optic networks. For example, a four channel optoelectronic assembly may be able to send and receive data at data transfer rates of approximately four times the data transfer rate of a comparable single channel optoelectronic assembly.

Ferrule assemblies may be used in fiber optic networks to physically and/or optically couple optical fibers with optoelectronic assemblies, optoelectronic subassemblies, optical components and/or electronic components. For example, ferrule assemblies may be used to couple ROSAs and/or TOSAs to optical fibers that are part of a fiber optic network thereby permitting the ROSA to receive optical signals and/or permitting the TOSA to transmit optical signals. Additionally or alternatively, ferrule assemblies may form part of an optoelectronic assembly or subassembly configured to transmit or receive electrical or optical signals in a fiber optic network.

Some optoelectronic assemblies may include hermetically sealed housings to protect components. However, space within hermetically sealed housings may be limited, especially if the optoelectronic assemblies comply with small form factor industry standards. Furthermore, increasing the size of hermetically sealed housings may increase the costs of producing optoelectronic assemblies. Conversely, decreasing the size of hermetically sealed housings may decrease the costs of producing optoelectronic assemblies.

Producing some hermetically sealing structures may increase the production costs of optoelectronic assemblies. In some circumstances, producing hermetically sealing structures with greater hermetically sealed portions may be more expensive than producing hermetically sealing structures with smaller hermetically sealed portions. Some hermetic sealing structures may add to the complexity of optoelectronic assemblies. Additionally or alternatively, some hermetic sealing structures may increase the size of optoelectronic assemblies.

Optoelectronic assemblies may need to comply with certain standards that may specify aspects of optoelectronic assemblies such as size, power handling, component interfaces, operating wavelengths or other specifications. Examples of such standards include CFP, XAUI, QSFP, QSFP+, XFP, SFP and GBIC. Complying with such standards may limit the structure, size, cost, performance or other aspects of optoelectronic assembly designs. Such standards may also limit configurations of components of optoelectronic assemblies such as receptacles that receive ferrule assemblies and/or hermetic sealing structures such as housings.

In some optoelectronic assemblies, electronic and/or radio frequency signal transmission lines ("RF lines") may couple lasers or other components of optoelectronic assemblies. The electrical performance of the RF lines ("RF performance" or "RF response") may be important to the operation optoelectronic assemblies. Accurately controlling and/or reducing the dimensions of RF lines may contribute to optoelectronic assemblies with suitable and/or favorable RF performance. However, the design and positioning of components of optoelectronic assemblies may prevent the length RF lines from being sufficiently controlled and/or minimized.

Components such as optoelectronic subassemblies or portions of optoelectronic subassemblies may be produced in large quantities and the produced components may need to comply with specifications that specify various aspects of the produced components (e.g. shape, dimensions and/or positioning). The produced components may include variations in the specifications. Some variation in specifications may be permitted because the produced components may be suitable or work properly. Some variations in specifications may result in components that are unsuitable. Tolerance may refer to an allowable amount of variation of a specification (e.g. dimension or positioning). Some specifications may have higher ("wider") or lower ("tighter") tolerance. For example, outside dimensions of optoelectronic subassemblies may have a wider tolerance because the variations may not affect the operation of the produced optoelectronic subassemblies. In another example, the positioning of optical components may require a tighter tolerance because the positioning affects the focus and/or transmission of optical signals. In yet another example, the dimensions of RF lines may require tighter tolerances because the dimensions may significantly affect RF performance.

The selected production processes may affect the prevalence and extent of the variations. In some circumstances the production processes may be controlled to increase or decrease the range of variation, the frequency of the variations, or other aspects. In some circumstances, producing components to tighter tolerances may increase production costs (or vice versa). For example, the tighter tolerance production processes may be more expensive than wider tolerance production processes. Tighter tolerance may result in more unsuitable components. Unsuitable components may be discarded without recovering production costs or repaired adding to production costs. Production processes may be modified to decrease or eliminate the production of unsuitable components, but in some circumstances this may increase costs.

FIGS. 1A-1D illustrate an optical component 100. The optical component 100 can include a housing 106 extending between a housing top 116 and a housing bottom 118. The housing top 116 and the housing bottom 118 generally refer to portions of the optical component 100 and are not limited to portions at or near the ends of the optical component 100. The optical component 100 may include a window 102 with a lens array 104 of lenses 103 (only one of which is labeled in the Figures for clarity). The lens array 104 may be configured to convey, direct, collimate and/or focus optical signals travelling between optoelectronic components such as header subassemblies and/or ferrule assemblies. Each lens 103 may be configured to convey, direct, collimate and/or focus optical signals corresponding to one channel of a multi-channel header subassembly. The optical component 100 may include a window seal 110 that contributes to providing a hermetic seal between the housing 106 and the window 102. The housing 106, the window 102 and/or the window seal 110 may define a cavity 119. In some configurations, the cavity 119 may hermetically seal portions of header subassemblies when coupled to header subassemblies and thus may be referred to as a hermetically sealed cavity 119.

Figure 3A:
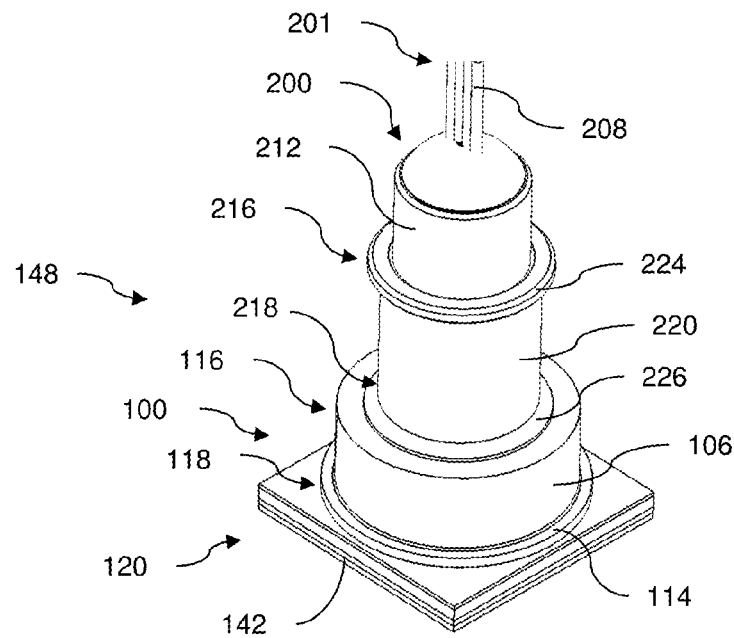
FIG. 3A is a perspective view of an example optoelectronic subassembly.
Figure 3B:
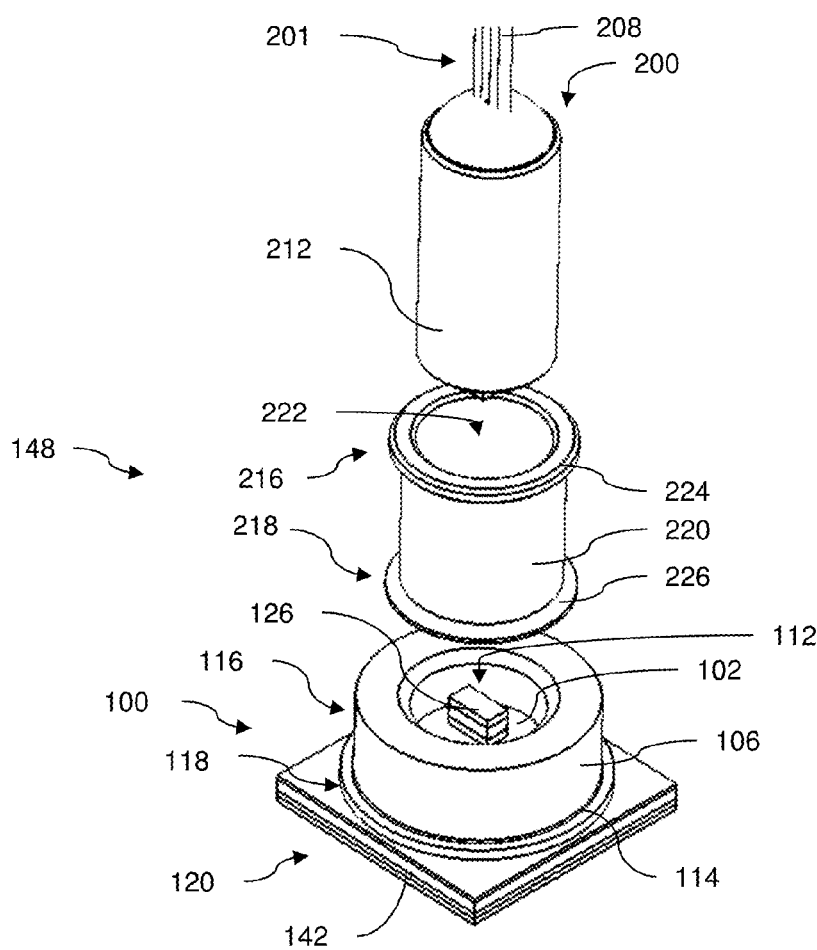
FIG. 3B is an exploded perspective view of the optoelectronic subassembly of FIG. 3A.
Figure 5:
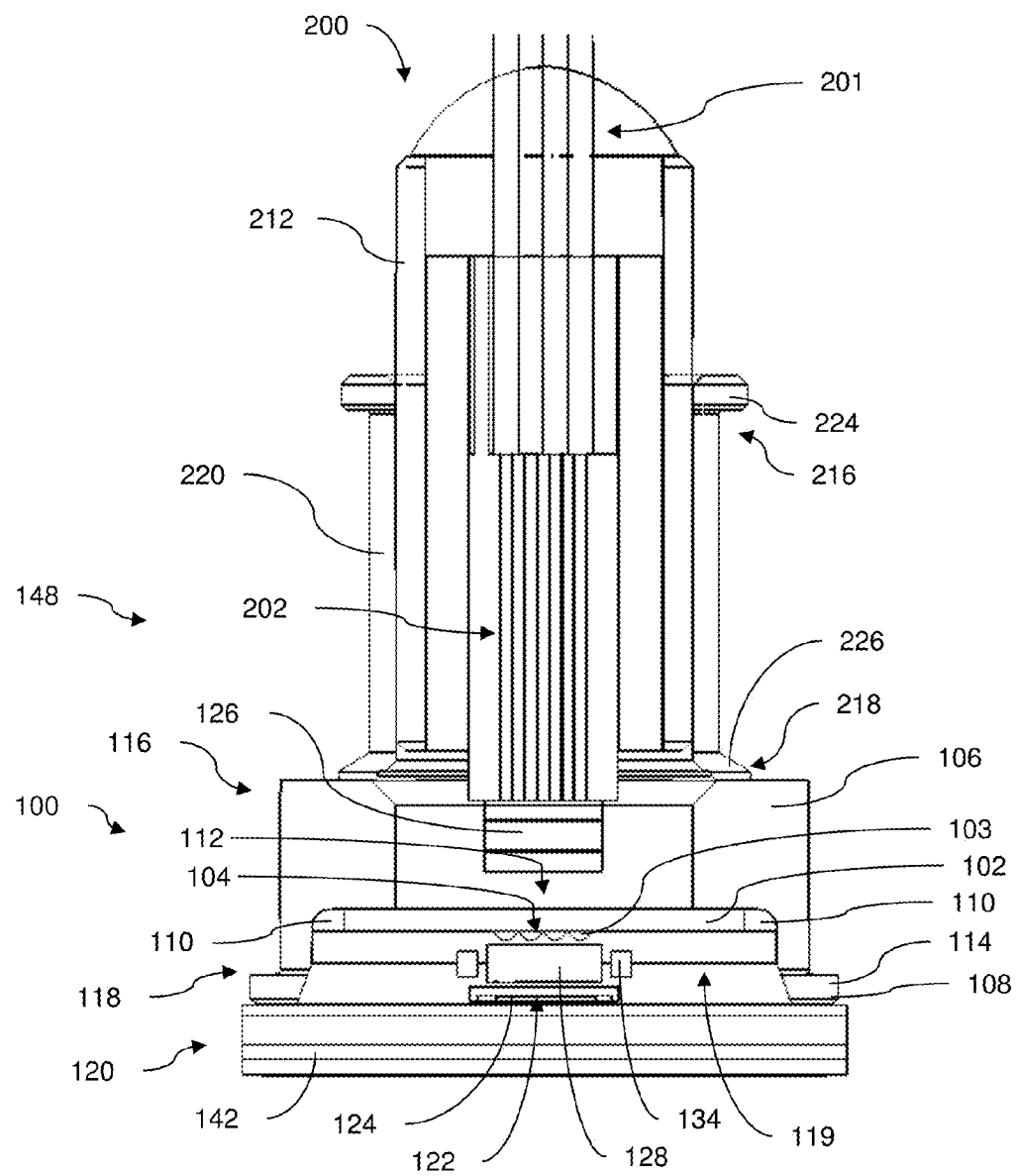
FIG. 5 is a side cross-sectional view of the optoelectronic subassembly of FIG. 3A.

The optical component 100 may include an aperture 112 defined by the housing 106 and/or the window 102. The aperture 112 may be configured (e.g. shaped and/or dimensioned) to permit optical signals to travel through at least a portion of the optical component 100 to the window 102. In some configurations, the aperture 112 may receive or house at least a portion of additional optical components within the aperture 112. For example, as illustrated in FIG. 3B and FIG. 5, the aperture 112 may receive an optical component 126 that may be an isolator or other components that relate to optical signals. The optical component 100 may include a housing flange 114 positioned on the housing bottom 118. The housing flange 114 may include a flange base 108 that may be configured (shaped and/or dimensioned) such that the optical component 100 may be coupled to other components, such as header assemblies. The housing top 116 may be configured (shaped and/or dimensioned) to interface with ferrule assemblies.

As illustrated for example in FIGS. 1A-1D, the housing 106 may be circular or annular, although the housing 106 may be any suitable configurations including rectangular, oval, multifaceted and other configurations. The window seal 110 may be substantially annular and positioned between the window 102 and the housing 106. In other configurations, the window seal 110 may not be annular. For example, in configurations where the housing 106 is rectangular, the window seal 110 may also include a corresponding rectangular configuration.

Turning to FIGS. 2A-2D, the window 102 will be described in further detail. The window 102 may be optically transmissive and may be integral to the housing 106 or coupled to the housing 106. The lens array 104 may be positioned on the window 102, at or near the housing bottom 118 and/or within the cavity 119. The lenses 103 of the optical component 100 may be optically transmissive surfaces configured to convey, direct, collimate and/or focus optical signals. The lenses 103 may be planar or curved surfaces (e.g. concave, or convex). As illustrated, in some configurations the lenses 103 may be optically transmissive convex surfaces. In some circumstances, such convex configurations of the lenses 103 may optimally convey, direct, collimate and/or focus optical signals. The lenses 103 may be coupled to or integral with the window 102. All or some of the lenses 103 may be configured (e.g. shaped, dimensioned and/or positioned) to convey, direct, collimate and/or focus optical signals corresponding to one channel of a multi-channel subassembly, such as header subassembly 120 (FIG. 3A-3B). In other configurations, all or some of the lenses 103 may be configured to convey, direct, collimate and/or focus optical signals corresponding to more than one channel.

In addition to or instead of contributing to providing a hermetic seal, the window seal 110 may contribute to coupling the window 102 to the housing 106. For example, for configurations where a hermetic seal is not desired or required, the window seal 110 may couple the window 102 to the housing 106 and may not contribute to providing a hermetic seal. In other configurations, the window seal 110 may both contribute in coupling the window 102 to the housing 106 as well as contribute to providing a hermetic seal.

In some configurations, the window seal 110 may not be positioned substantially between the window 102 and the housing 106. For example, the window 102 and the housing 106 may be coupled to one another at interfaces and the window seal 110 may cover some or all of the interfaces between the window 102 and the housing 106 to contribute to providing a hermetic seal. In such configurations, the window seal 110 may seal any spaces located at some or all of the interfaces.

Certain aspects of the optical component 100 may facilitate economical production of optoelectronic subassemblies with multiple channels ("multi-channel optoelectronic subassemblies"). Aspects of the optical component 100 may contribute to decreased production costs for optoelectronic subassemblies that incorporate the optical component 100. For example, some aspects of the optical component 100 may simplify the production processes involving optoelectronic subassemblies. In another example, some aspects of the optical component 100 may decrease the costs of the materials used to produce the optical component 100 and/or optoelectronic subassemblies. In yet another example, some aspects of the optical component 100 may decrease the necessary size of the hermetically sealed portions of optoelectronic subassemblies. Additionally or alternatively, aspects of the optical component 100 may decrease the size or clearance of optoelectronic subassemblies incorporating the optical component 100.

In some aspects, portions of the optical component 100 may be formed by molding, machining, stamping, deposition, printing or any suitable technique. In other aspects, the production technique may be chosen taking into consideration the cost of producing the optical component 100 using that technique. In further aspects, the production technique may be chosen taking into consideration the tolerances necessary for various dimensions of the optical component 100. In other aspects, the production technique may be chosen to facilitate the optical component 100 forming a hermetic seal around a portion of the header subassembly 120.

The optical component 100 may be formed of any suitable material or materials. At least a portion of the housing 106 may be formed of a metal, metallic material, plastic polymer or ceramic. In some aspects, the material used to form the housing 106 may be selected to contribute to cost-effective production of optoelectronic subassemblies incorporating the housing 106. The material selected may be an economical material suitable to form the housing 106 while maintaining suitable characteristics such as optical characteristics, tolerances, heat management characteristics, or other characteristics. In another example, the material may be selected taking into consideration the cost of processing the material to form the housing 106. In yet another example, the material may be selected taking into consideration various aspects of producing optoelectronic subassemblies incorporating the housing 106 such as coupling or aligning the housing 106 with other components.

The window 102 may be formed partially or entirely of an optically transmissive material. For example, the window 102 may be formed partially or entirely of glass, plastic polymer, or other suitable materials. The portions of the window 102 under and/or over the lenses 103 can be transparent, translucent, or optically transmissive. In some configurations, the window 102 may be opaque or optically non-transmissive in regions outside of or lateral of the lenses 103 of the lens array 104. As such, optical signals may only traverse the window 102 in the regions of the lenses 103. Any of the lenses 103 may be formed partially or entirely of an optically transmissive material such as glass, plastic polymer silicon, silicon compounds or other suitable materials. The lenses 103 may be integrally formed with the window 102 or coupled to the window 102 during or after its production.

The window 102 and lenses 103 may be integrally formed by molding, machining, stamping, deposition or other suitable process. In some circumstances, integrally molding the lenses 103 and the window 102 from glass (or plastic polymer) may contribute to cost-effective production of the optical component 100. If the lenses 103 are not integrally formed with the window 102, they may be individually formed by molding, machining, stamping, deposition, any other suitable process or combination of such processes. Then, the lenses 103 may be coupled to the window 102 by fusing, soldering, adhesive, or by any other suitable coupling technique. Alternatively, if the lenses 103 are not integrally formed with the window 102, they may be formed on the window 102 by deposition, printing, machining or other suitable process.

FIGS. 3A-3B, 4A-4B and 5 illustrate various views of an optoelectronic subassembly 148 incorporating the optical component 100. As illustrated, the optical component 100 may be configured to interface with a header subassembly 120 and/or a ferrule assembly 200. The housing bottom 118 may be configured (shaped and/or dimensioned) to interface with the header subassembly 120. The housing top 116 may be configured (shaped and/or dimensioned) to interface with the ferrule assembly 200. The ferrule assembly 200 may include multiple optical fibers 202, with each optical fiber 202 configured to convey optical signals corresponding to at least one channel of a multi-channel optoelectronic subassembly, such as an optoelectronic subassembly 148. The optical component 100 may be configured to convey, direct, collimate and/or focus optical signals between the header subassembly 120, the ferrule assembly 200 and/or other components.

The header subassembly 120 may include any suitable aspects of U.S. Provisional Application 62/069,710 filed Oct. 28, 2014, entitled MULTI-LAYER SUBSTRATES and/or U.S. Provisional Application 62/069,712 filed Oct. 28, 2014, entitled SUBSTRATES INCLUDING OPTOELECTRONIC COMPONENTS, which are both hereby incorporated by reference in their entirety.

The header subassembly 120 may include a substrate 142 and optoelectronic components 122 coupled to or formed on the substrate 142. The substrate 142 may be a multilayer substrate. The optoelectronic components 122 may include any suitable components that may be used in optoelectronic subassemblies such as TOSAs, ROSAs and/or other optoelectronic subassemblies. The optoelectronic components 122 may include drivers, monitor photodiodes, integrated circuits, inductors, capacitors, receivers, receiver arrays, control circuitry, lenses, laser arrays, or any suitable optoelectronic components. Although not illustrated, electrical lines may couple any of the optoelectronic components 122 to one another and/or to other components. In some configurations, the header subassembly 120 may include contact pads that permit electrical power and/or control signals to be conveyed to the optoelectronic components 122 or other components via the electrical lines. Additionally or alternatively, some of the optoelectronic components 122 may be optically coupled to one other.

The optoelectronic components 122 may include a lens 128 retained by a lens coupling 134. As illustrated, if the optoelectronic subassembly 148 includes a TOSA, the optoelectronic components 122 may include a laser array 124 and the lens 128 may be configured to convey, direct, collimate and/or focus optical signals from the laser array 124. In another example, if the optoelectronic subassembly 148 includes a ROSA, the optoelectronic components 122 may include a receiver array and the lens 128 may be configured to convey, direct, collimate and/or focus optical signals to the receiver array. In some configurations, the optoelectronic subassembly 148 may include both a TOSA and a ROSA and the optoelectronic components 122 may include suitable components for both TOSAs and ROSAs.

The header subassembly 120 may be a multi-channel header subassembly and the optoelectronic components 122 may be configured to transmit, receive, direct, collimate, convey and/or focus multiple optical signals, each corresponding to one channel. If the header subassembly 120 is a multi-channel transmitter subassembly, the laser array 124 may be a multi-channel laser array configured to transmit multiple optical signals to corresponding optical fibers 202. In some configurations, the laser array 124 may be configured to transmit optical signals to four corresponding optical fibers 202, although other configurations are contemplated. If the header subassembly 120 is a multi-channel receiver subassembly, the receiver array may be a multi-channel receiver array configured to receive multiple optical signals from corresponding optical fibers. In some configurations, the receiver array may be configured to receive optical signals from four corresponding optical fibers, although other configurations are contemplated. The laser array 124 can have the same number of discrete laser emitters as lenses 103 in the lens array 104.

The ferrule assembly 200 may include any suitable aspects of patent application Ser. No. 14/824,883, filed Aug. 12, 2015, entitled FERRULE ASSEMBLIES, and Provisional Application 62/036,714, filed Aug. 13, 2014, entitled FERRULE ASSEMBLIES, which are both hereby incorporated by reference in their entirety. Aspects of "Ferrule Assemblies" may be incorporated in the ferrule assemblies described in this application and/or the configurations of optoelectronic subassemblies.

The ferrule assembly 200 may be configured to couple multiple optical fibers 202 in the optoelectronic subassembly 148. Each optical fiber 202 may correspond to one channel of a multi-channel optoelectronic subassembly. The ferrule assembly 200 may be configured to retain optical fibers 202 of corresponding optical cables 201 (which may be a single optical cable or a plurality of optical cables, such as ribbon optical cables) positioned between upper and lower clamp members. The optical cables 201 can include casings 208 surrounding at least a portion of the optical fibers 202. The casing 208 can be configured to insulate and/or guard the optical fibers 202. As illustrated, at least one or all of the optical fibers 202 can include a corresponding one of the casings 208.

A ferrule body 212 may surround at least a portion of the optical fibers 202. In some configurations, the ferrule body 212 may be annular or cylindrical. As illustrated, the ferrule assembly 200 can be configured to retain the optical fibers 202 in a linear configuration where at least a portion of the optical fibers 202 share a common plane. Additionally or alternatively, the optical fibers 202 may be arranged in any suitable configuration such as square, rectangular, circular or any other configuration. The configuration of the optical fibers 202 of the ferrule assembly 200 may correspond to the configuration of the optical component 100 and or the header subassembly 120.

The ferrule assembly 200 may include an alignment sleeve 220 configured to facilitate alignment of the ferrule assembly 200. The alignment sleeve 220 may include a cylindrical body extending between a sleeve top 216 and a sleeve bottom 218 and defining a sleeve cavity 222. The sleeve cavity 222 may include a configuration (e.g., shape and/or dimension) corresponding to the ferrule body 212 in order to receive the ferrule body 212. If the ferrule body 212 is cylindrical, as illustrated, the sleeve cavity 222 may include a diameter corresponding to a diameter of the ferrule body 212 so that the ferrule body 212 may be positioned at least partially inside of the alignment sleeve 220. For example, the diameter of the sleeve cavity 222 may be about the same or slightly greater than the diameter of the ferrule body 212. Such configurations may permit the ferrule assembly 200 to be repositioned in a longitudinal direction along a longitudinal axis with respect to the alignment sleeve 220. This configuration may also limit the range of motion of the ferrule assembly 200 such that it may not be repositioned along axes transverse to the longitudinal axis with respect to the alignment sleeve 220. The ferrule body 212 may be fixed to the alignment sleeve 220. For example, the ferrule body 212 may be coupled to the alignment sleeve 220 by soldering, welding, laser welding, fusing, adhesive, mechanical fastening or any other suitable technique.

The alignment sleeve 220 may include an upper sleeve flange 224 positioned on the sleeve top 216 and/or a lower sleeve flange 226 positioned on the sleeve bottom 218. The sleeve bottom 218 of the alignment sleeve 220 may be configured (e.g. shaped and/or dimensioned) to interface with the optical component 100. As illustrated for example in FIG. 5, the lower sleeve flange 226 and/or the sleeve bottom 218 may be positioned against the housing top 116 thereby preventing the alignment sleeve 220 from being inserted into the aperture 112. In such configurations, a portion of the ferrule assembly 200 may be positioned in the aperture 112. In alternative configurations, the alignment sleeve 220 may be configured to be partially inserted into the aperture 112 and the lower sleeve flange 226 and/or the sleeve bottom 218 may prevent the alignment sleeve 220 from being inserted further into the aperture 112.

As illustrated for example in FIGS. 3A and 3B, both the alignment sleeve 220 and the housing top 116 of the optical component 100 may include corresponding cylindrical configurations. In alternative configurations, the alignment sleeve 220 and/or the housing top 116 may not be cylindrical. As illustrated, for example in FIG. 4A, the ferrule body 212 may be fixed to the alignment sleeve 220 and may be rotated with respect to the optical component 100. In other configurations, the configuration of the alignment sleeve 220 and/or the housing top 116 may prevent the ferrule body 212 that is fixed to the alignment sleeve 220 from being rotated with respect to the optical component 100. In some configurations if the optical fibers 202 include a linear configuration as illustrated, the ferrule body 212 with the alignment sleeve 220 may be rotated with respect to the optical component 100 to align the optical fibers 202 with corresponding linear configurations of the optical component 100 and/or the header subassembly 120.

As illustrated for example in FIG. 5, the sleeve bottom 218 may interface with the housing top 116 at the lower sleeve flange 226. The lower sleeve flange 226 may contribute to preventing the alignment sleeve 220 and the ferrule body 212 from tilting with respect to the optical component 100. The lower sleeve flange 226 may also prevent the ferrule body 212 from moving in the longitudinal direction with respect to the optical component 100. However, the lower sleeve flange 226 may permit the alignment sleeve 220 and the ferrule body 212 to be repositioned along the axes transverse to the longitudinal axis and/or to be rotated with respect to the optical component 100. The alignment sleeve 220 may be fixed to the optical component 100. For example, the alignment sleeve 220 may be fixed to the optical component 100 by soldering, welding, laser welding, fusing, adhesive, mechanical fastening or any other suitable technique.

In some configurations, the optical component 100 may be configured to hermetically seal portions of the header subassembly 120 and/or optoelectronic components 122. The housing bottom 118 may be configured (e.g. shaped and/or dimensioned) to interface with the header subassembly 120. The housing flange 114 and/or the flange base 108 may be configured (e.g. shaped, dimensioned and/or positioned) to be coupled to a portion of the header subassembly 120. The optical component 100 may be coupled to the header subassembly 120 by welding, soldering, glass soldering, adhesives, fasteners, fusing or any other suitable technique. The coupling between the optical component 100 and the header subassembly 120 may contribute to hermetically sealing portions of the header subassembly 120 and/or optoelectronic components 122.

The optical component 100 (e.g. the window 102) may be configured to permit optical signals to travel between the ferrule assembly 200 and the header subassembly 120 (e.g. the optoelectronic components 122) when the optical component 100 is positioned there between. For example, in some configurations optical signals may travel from the laser array 124, through the lens array 104 and the window 102 of the optical component, through the aperture 112, and to the optical fibers 202. In another example, in some configurations optical signals may travel from the optical fibers 202, through the aperture 112, the window 102 and the lens array 104 of the optical component 100, then to the receiver array of the header subassembly 120.

Figure 6A:
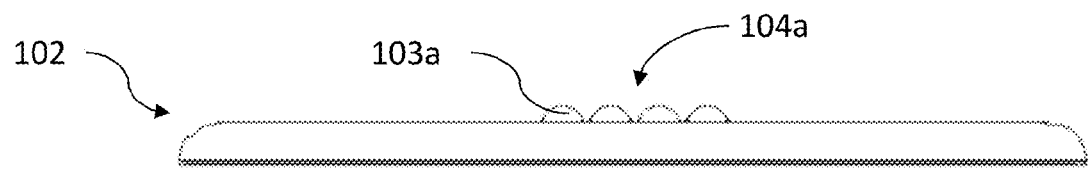
FIGS. 6A-6B are side views of example windows.

As illustrated for example in FIGS. 2A-2D, the lens array 104 may be positioned on one side of the window 102 and within the cavity 119. As illustrated for example in FIG. 6A, in other configurations the lenses 103a of the lens array 104a may be positioned on the other side of the window 102 in a position corresponding to the aperture 112, such as on the light receiving side of the window 102 for a ROSA or light transmitting side of the window 102 for a TOSA.

Figure 6B:
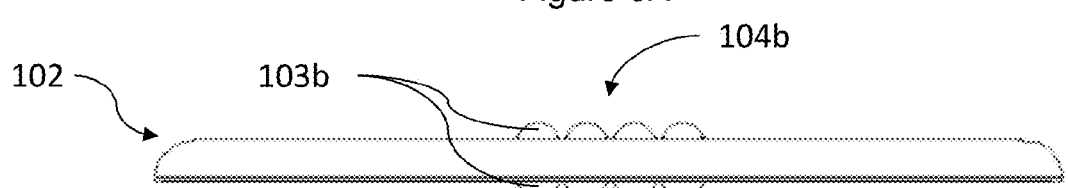

As illustrated for example in FIG. 6B, in some configurations the lens array 104b may include lenses 103b positioned on two sides of the window 102, such as on both the light receiving and the light transmitting sides. In such configurations, corresponding pairs of lenses 103b may both contribute to focusing and/or transmitting optical signals and may be considered one lens with two optical surfaces. In such configurations, the optical component 100 may have improved optical characteristics. In some circumstances, including the lens array 104b on both sides of the window 102 may increase the cost of the optical component 100. For example, producing lenses 103b on one side that align with corresponding lenses 103b on the other side may increase the cost of producing the optical component 100 because the lenses 103b may be more difficult to align and/or because the optical component 100 may require narrower tolerances.

Any of the lenses 103b positioned on both sides may be planar or curved. In some configurations, corresponding pairs of the lenses 103b may be biconvex, equiconvex, biconcave, plano-convex, plano-concave, convex-concave, positive meniscus, negative meniscus and/or other suitable configurations. Corresponding pairs of the lenses 103b may contribute to focusing and/or transmitting optical signals for one channel of a multi-channel optoelectronic subassembly (or more than one channel).

Figure 1B:
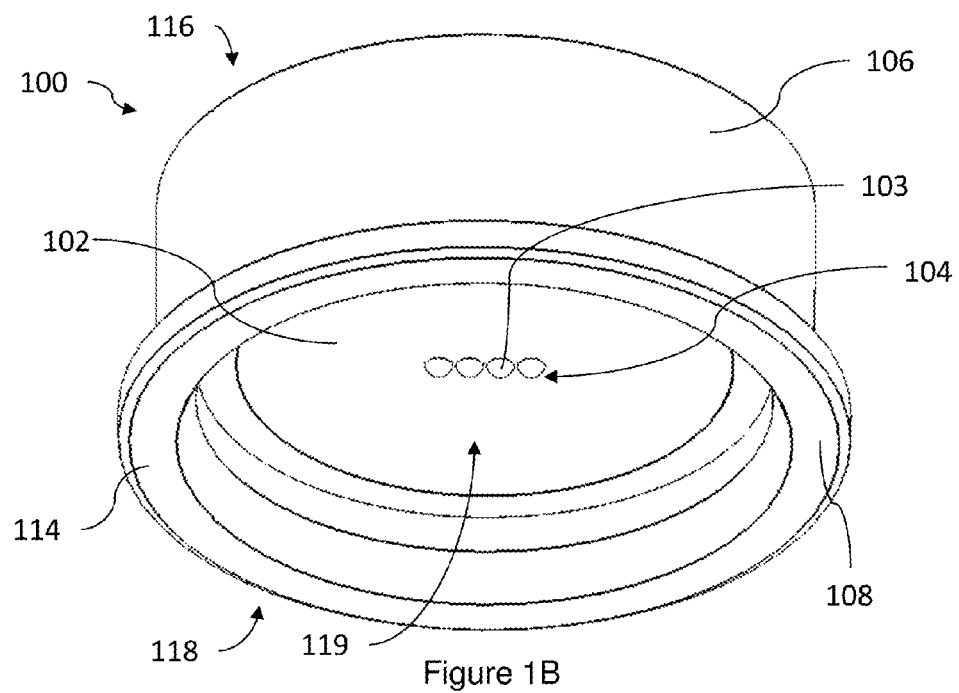
FIG. 1B is a bottom perspective view of the optical component of FIG. 1A.
Figure 2A:
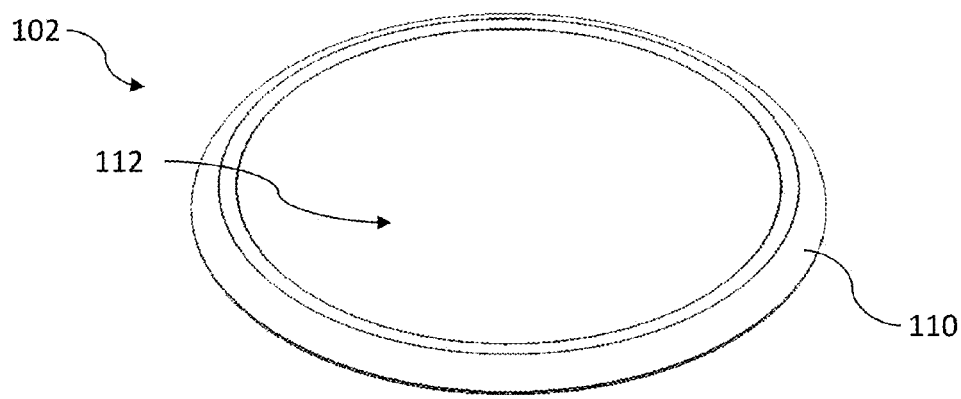
FIG. 2A is a top perspective view of an example window.
Figure 2B:
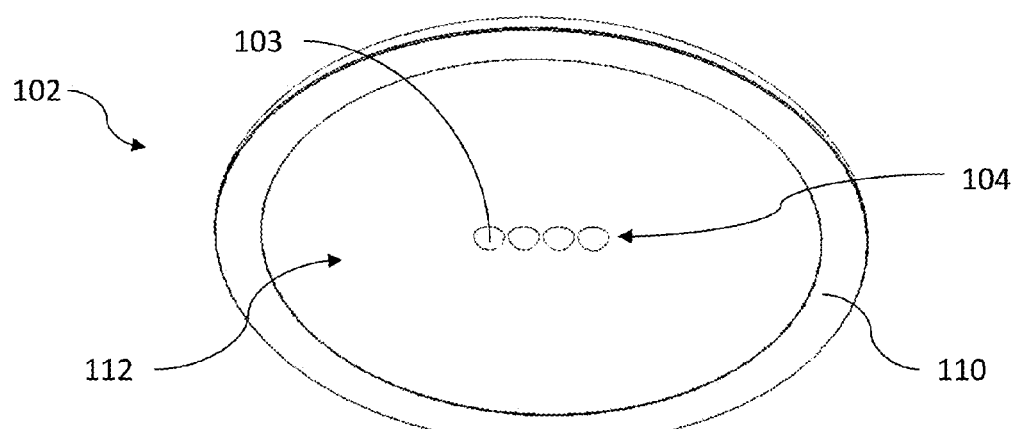
FIG. 2B is a bottom perspective view of the window of FIG. 2A.
Figure 2C:
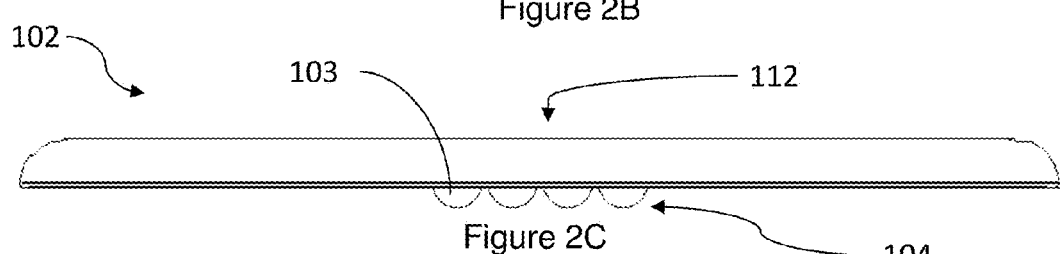
FIG. 2C is a side view of the window of FIG. 2A.
Figure 2D:
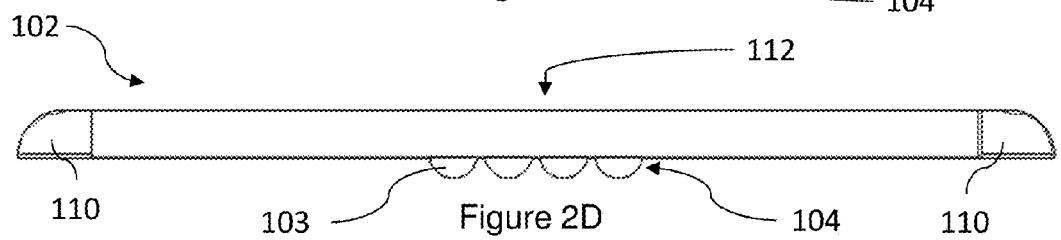
FIG. 2D is a side cross-sectional view of the window of FIG. 2A.

The lens array 104 may include any suitable configuration of lenses 103. For example, the lens array 104 may include a linear configuration as illustrated in FIGS. 1B and 1C. In some configurations the lens array 104c may include a square or rectangular configuration, as illustrated for example in FIG. 6C. In some configurations the lens array 104d may include a circular or annular configuration, as illustrated for example in FIG. 6D.

Figure 6C:
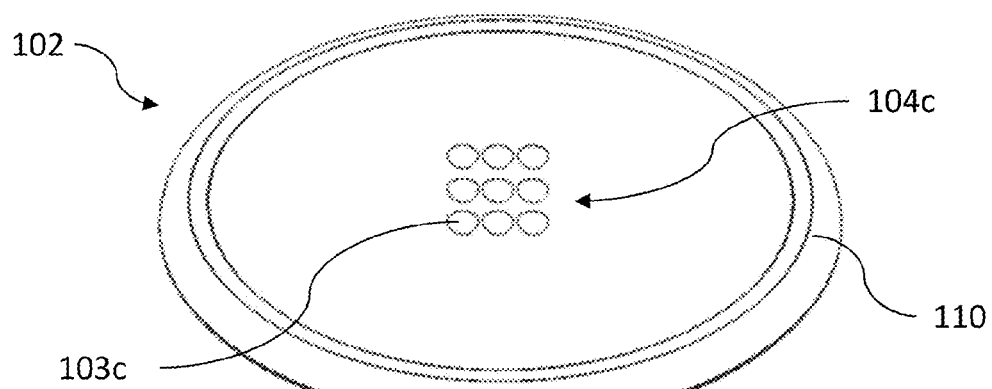
FIGS. 6C-6D are top perspective views of example windows.
Figure 6D:
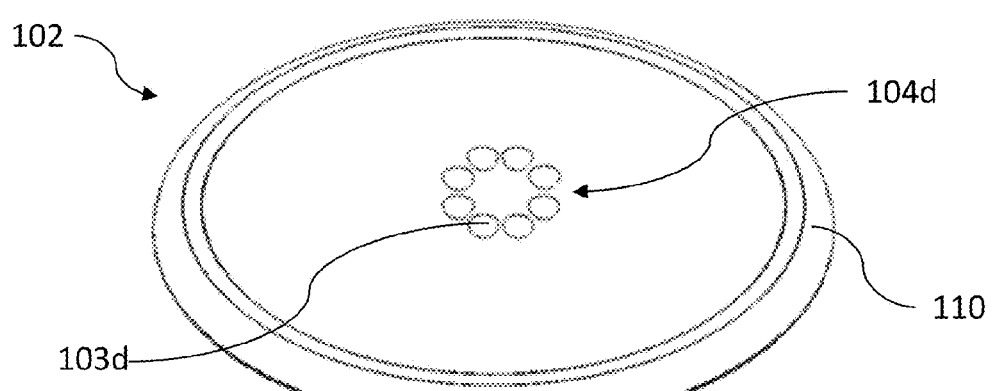

The lens array 104 may include any suitable number of lenses. For example, FIGS. 1A and 1C illustrate the lens array 104 with four lenses 103. In another example, FIG. 6C illustrates the lens array 104c with nine lenses 103c. As illustrated for example in FIG. 6B, the lens array 104b may include eight lenses 103b. In such configurations, corresponding pairs of lenses 103b may contribute to conveying, directing, collimating and/or focusing optical signals for one channel of a multi-channel optoelectronic subassembly. As illustrated for example in FIG. 6D, the lens array 104d may include eight lenses 103d but corresponding pairs of lenses may not act together to convey, direct, collimate and/or focus optical signals for one channel. In such configurations, each lens 103d may be configured to convey, direct, collimate and/or focus optical signals for one channel of an eight channel optoelectronic subassembly.

Any suitable aspects of any of FIGS. 6A-6D may be incorporated into the optical component 100 and/or the configurations of the ferrule assembly 200, the header subassembly 120 and/or the optoelectronic subassembly 148.

In some configurations, an optical component can include a housing defining a cavity and a lens array having a plurality of lenses on an optically transmissive portion of the housing. In some configurations of the optical component, the optically transmissive portion can be a window. In some configurations, the optical component can include a window seal at least partially surrounding the window. In some configurations, the optical component can include an aperture defined by a housing top of the housing. In some configurations, the optical component can include a housing flange positioned on a housing bottom of the housing.

In some configurations of the optical component, the lenses can be discrete members coupled to the window. In some configurations of the optical component, the lenses can be integral to the window. In some configurations of the optical component, the window can be formed integrally with the housing. In some configurations of the optical component, the window can be a discrete member coupled to the housing. In some configurations of the optical component, the lenses can be positioned on the optically transmissive portion within the cavity. In some configurations of the optical component, the lenses can be positioned on both sides of the optically transmissive portion. In some configurations of the optical component, the lenses can be optically transmissive convex surfaces. In some configurations of the optical component, the window seal can couple the window to the housing.

In some configurations of the optical component, at least a portion of the optical component can be formed by molding, machining, stamping, deposition or printing. In some configurations of the optical component, the housing can be formed with metal. In some configurations of the optical component, the window can be formed with a glass or plastic polymer. In some configurations of the optical component, the optically transmissive portion extends laterally of the lenses. In some configurations of the optical component, the entire window can be formed of an optically transmissive material. In some configurations of the optical component, the entire optical component can be formed of optically transmissive material.

In some configurations of the optical component, the lens array can include a linear distribution such that the lenses can be linearly aligned with respect to one another. In some configurations of the optical component, the lens array can include a non-linear distribution of lenses. In some configurations of the optical component, the optical component can be integrally formed by molding, machining, stamping, deposition or printing. In some configurations of the optical component, the housing can be circular or annular. In some configurations of the optical component, the lens array can consist of convex lenses.

In some configurations, an optical component can include a substrate; and a lens array on the substrate, the lens array having a plurality of discrete lenses. In some configurations of the optical component, the lens array can consist of convex lenses. In some configurations of the optical component, the lens array consists of four convex lenses.

In some configurations, the optical component can include a housing at least partially surrounding the window. In some configurations of the optical component, the housing can include a housing top defining an aperture. In some configurations of the optical component, the housing can include a housing bottom with a housing flange.

In some configurations of the optical component, the window can be optically transmissive at least under or over the lenses. In some configurations of the optical component, the entire window can be optically transmissive. In some configurations, the optical component can include a window seal between the housing and the window. In some configurations of the optical component, the housing can be formed with metal. In some configurations of the optical component, the window can be formed with a glass or plastic polymer.

In some configurations, an optoelectronic subassembly can include: a multi-channel header subassembly with a substrate and optoelectronic components on the substrate, the optoelectronic components configured to transmit and/or receive optical signals; and an optical component with a housing defining a cavity and a lens array having a plurality of lenses on an optically transmissive portion of the housing.

In some configurations, the optoelectronic subassembly can include a ferrule assembly can include a ferrule body configured to retain optical fibers. In some configurations, the ferrule assembly can include: an upper clamp member and a lower clamp member configured to retain optical fibers positioned between the upper and lower clamp members; a ferrule body surrounding at least a portion of the upper and lower clamp members; and optical fibers retained between the upper and lower clamp members, each optical fiber capable of conveying optical signals corresponding to one channel. In some configurations, the ferrule assembly can include an alignment sleeve with a sleeve cavity shaped and dimensioned to receive the ferrule body such that the ferrule body can be longitudinally positioned with respect to the alignment sleeve. In some configurations of the optoelectronic subassembly, the ferrule assembly can be coupled to the optical component.

In some configurations of the optoelectronic subassembly, the ferrule body can be cylindrical, the alignment sleeve can be cylindrical, and the ferrule body can be rotated with respect to the alignment sleeve when positioned at least partially within the alignment sleeve. In some configurations of the optoelectronic subassembly, the alignment sleeve can be fixed to the optical component optically aligned with the ferrule assembly. In some configurations of the optoelectronic subassembly, the alignment sleeve can be soldered, welded, laser welded, fused, adhered or mechanically fastened to the optical component.

In some configurations of the optoelectronic subassembly, the optoelectronic components can include a receiver array configured to receive multiple optical signals from corresponding optical fibers. In some configurations of the optoelectronic subassembly, the optoelectronic components include a laser array configured to transmit multiple optical signals to corresponding optical fibers.

In some configurations of the optoelectronic subassembly, the optically transmissive portion can be a window. In some configurations of the optoelectronic subassembly, the housing defines an aperture. In some configurations, the optoelectronic subassembly can include a housing flange positioned on a housing bottom of the housing. In some configurations of the optoelectronic subassembly, the housing can be circular or annular.

In some configurations of the optoelectronic subassembly, the lenses can be discrete members coupled to the optically transmissive portion. In some configurations of the optoelectronic subassembly, the lenses can be integral to the optically transmissive portion. In some configurations of the optoelectronic subassembly, the window can be formed integrally with the housing.

In some configurations of the optoelectronic subassembly, the optical component can be coupled to the header subassembly. In some configurations of the optoelectronic subassembly, the optical component can be coupled to the header subassembly at a housing bottom. In some configurations of the optoelectronic subassembly, the cavity can hermetically seal at least one of the optoelectronic components of the header subassembly. In some configurations of the optoelectronic subassembly, the optical component can be coupled to the header subassembly by welding, soldering, glass soldering, adhesives, fasteners, or fusing.

In some configurations of the optoelectronic subassembly, the optical component can include a window seal sealing the housing and the window. In some configurations of the optoelectronic subassembly, the window seal can couple the window to the housing. In some configurations of the optoelectronic subassembly, the window can be coupled to or integral with the housing. In some configurations of the optoelectronic subassembly, the lenses can be coupled to or integral with the window.

In some aspects, a method can include providing an optical component can include a housing defining a cavity and a lens array having a plurality of lenses on an optically transmissive portion of the housing. In some aspects of the method, the optical component can include any suitable aspects described above.

In some aspects, the method can include providing one or more of: a header subassembly with a substrate and optoelectronic components on the substrate, the optoelectronic components configured to transmit and/or receive optical signals; and a ferrule assembly can include a ferrule body retaining optical fibers.

In some aspects, the method can include hermetically sealing the optoelectronic components by coupling the optical component to the header subassembly. In some aspects, the method can include soldering, fusing, welding, laser welding, adhering, or mechanical fastening the optical component to the header subassembly. In some aspects of the method, at least one of the optoelectronic components can be optically aligned with the lens array. In some aspects, the method can include coupling the ferrule assembly with the optical component. In some aspects of the method, the optical fibers can be optically aligned with the lens array. In some aspects, the method can include integrally forming the lenses with the housing. In some aspects, the method can include coupling the lenses to the housing.

In some aspects, the method can include molding, machining, stamping, deposition or printing the lenses over the optically transmissive portion of the housing. In some aspects, the method can include forming the housing with metal. In some aspects, the method can include forming the optically transmissive portion of the housing with a glass or plastic polymer. In some aspects, the method can include integrally forming the optical component by molding, machining, stamping, deposition or printing. In some aspects of the method, the lenses can be optically transmissive convex surfaces.

In some configurations, an optical component can include one or more of: a housing extending between a housing top and a housing bottom; a window that can be at least partially optically transmissive such that the window permits optical signals to travel between a ferrule assembly and a header subassembly when the optical component is positioned there between; a lens array can include lenses configured to convey optical signals corresponding to channels of a multi-channel subassembly; a cavity defined by the housing and the window, the cavity configured to hermetically seal portions of the header subassembly when the optical component can be coupled to header subassembly; a window seal that contributes to providing a hermetic seal between the housing and the window; an aperture defined by the housing and the window, the aperture configured to permit optical signals to travel through at least a portion of the optical component to the window; a housing flange positioned on the housing bottom and can include a flange base shaped and dimensioned to interface with the header subassembly; and a housing top shaped and dimensioned to interface with the ferrule assembly.

In some configurations of the optical component, each of the lenses can be configured to focus optical signals corresponding to one channel of a multi-channel header subassembly. In some configurations, the cavity can be configured to enclose and hermetically seal optoelectronic components positioned on the header subassembly when the optical component can be coupled to header subassembly. In some configurations, the lens array can be positioned on the window within the cavity. In some configurations, the lenses can be transmissive convex surfaces configured to convey optical signals. In some configurations, the housing can be circular or annular. In some configurations, the window seal contributes to coupling the window to the housing. In some configurations, the window seal can be configured to seal spaces located at interfaces between the window and the housing. In some configurations, at least a portion of the optical component can be formed by molding, machining, stamping, deposition or printing. In some configurations, at least a portion of the optical component can be formed of a metal. In some configurations, at least a portion of the window can be formed of a glass or plastic polymer. In some configurations, the window can be coupled to or integral with the housing. In some configurations, the lenses can be coupled to or integral with the window. In some configurations, the optical component and the ferrule assembly can be configured such that a spaced portion permits the ferrule assembly to be positioned with respect to the optical component.

In some configurations, an optoelectronic subassembly can include one or more of: a multi-channel header subassembly with a substrate and optoelectronic components coupled to or formed on the substrate, the optoelectronic components configured to transmit and/or receive multiple optical signals each corresponding to one channel; an optical component coupled to the header subassembly, the optical component can include a housing extending between a housing top and a housing bottom; a window that can be at least partially optically transmissive such that the window permits the optical signals to travel between a ferrule assembly and the header subassembly through the optical component positioned there between; a lens array including lenses configured to convey the optical signals each corresponding to one channel; and a cavity defined by the housing and the window, the cavity can hermetically seal portions of the header subassembly.

In some configurations of the optoelectronic subassembly, the optoelectronic components can include a receiver array configured to receive multiple optical signals from corresponding optical fibers. In some configurations of the optoelectronic subassembly, the optoelectronic components can include a laser array configured to transmit multiple optical signals to corresponding optical fibers. In some configurations of the optoelectronic subassembly, the optical component can be coupled to the header subassembly by welding, soldering, glass soldering, adhesives, fasteners, or fusing.

The present disclosure may be embodied in other specific forms without departing from its spirit or essential characteristics. The described configurations are to be considered in all respects illustrative and not restrictive. The scope of the disclosure is indicated by the appended claims rather than by the foregoing description. All changes that come within the meaning and range of equivalency of the claims are to be embraced within their scope.

What is claimed is:

1. An optoelectronic subassembly comprising:
   a multi-channel header subassembly comprising:
      a substrate; and
      optoelectronic components coupled to or formed on the substrate, the optoelectronic components configured to transmit and/or receive multiple optical signals each corresponding to one channel; and
   an optical component coupled to the header subassembly, the optical component comprising:
      a circular housing extending between a housing top and a housing bottom, the housing top defining an aperture sized and shaped to receive a corresponding circular ferrule assembly such that the ferrule assembly is rotatable when positioned at least partially in the aperture;
      a window in the aperture that is at least partially optically transmissive such that the window permits the optical signals to travel between the ferrule assembly and the header subassembly through the optical component positioned there between;
      a lens array including lenses configured to convey the optical signals each corresponding to one channel; and
      a cavity defined by the housing and the window, the cavity hermetically sealing portions of the header subassembly.

2. The optoelectronic subassembly of claim 1, wherein the optical component is coupled to the header subassembly at the housing bottom such that the cavity hermetically seals at least one of the optoelectronic components of the header subassembly.

3. The optoelectronic subassembly of claim 1, the optical component further comprising a window seal positioned between the housing and the window, wherein the window seal couples the window to the housing in the aperture.

4. The optical component of claim 1, wherein the lenses are optically transmissive convex surfaces.

5. The optoelectronic subassembly of claim 1, further comprising:
   a ferrule body configured to retain optical fibers, each optical fiber conveying optical signals corresponding to one channel; and
   an alignment sleeve including a sleeve cavity shaped and dimensioned to receive the ferrule body such that the ferrule body can be longitudinally positioned with respect to the alignment sleeve;
   wherein the ferrule body is cylindrical, the alignment sleeve is cylindrical, and the ferrule body can be rotated with respect to the alignment sleeve when positioned at least partially within the alignment sleeve.

6. A method comprising:
   providing an optical component including a housing defining a cavity and an aperture, the optical component including a lens array having a plurality of discrete lenses on an optically transmissive portion of the housing;
   positioning the optical component over a header subassembly, the header subassembly including a substrate and optoelectronic components on the substrate, wherein at least one of the optoelectronic components is configured to transmit and/or receive optical signals and is optically aligned with the lens array;
   hermetically sealing the optoelectronic components in the cavity of the housing;
   inserting a ferrule assembly including optical fibers at least partially into the aperture; and
   rotating the ferrule assembly with respect to housing when the ferrule assembly is positioned at least partially in the aperture.

7. The method of claim 6, wherein the optical component is coupled to the header subassembly by soldering, fusing, welding, laser welding, adhering, or mechanical fastening the optical component to the header subassembly.

8. The method of claim 6, further comprising coupling the ferrule assembly to the optical component, the ferrule assembly including a ferrule body retaining optical fibers, wherein the optical fibers are optically aligned with the lens array.

9. The method of claim 6, further comprising integrally forming the lenses with the housing or coupling the lenses to the housing.

10. The method of claim 7, further comprising forming the lenses by molding, machining, stamping, deposition or printing the lenses over the optically transmissive portion of the housing.

11. The method of claim 10, wherein the lenses include a linear distribution such that the lenses are linearly aligned with respect to one another.

12. The method of claim 6, further comprising integrally forming the optical component by molding, machining, stamping, deposition or printing.

13. The optoelectronic subassembly of claim 1, wherein the window extends laterally of the lenses.

14. The optoelectronic subassembly of claim 1, further comprising a housing flange positioned on the housing bottom of the housing, the housing flange positioned against the substrate.

15. The optoelectronic subassembly of claim 1, wherein the lens array includes a linear distribution such that the lenses are linearly aligned with respect to one another.

16. The optoelectronic subassembly of claim 1, wherein the lens array includes a non-linear distribution of lenses.

* * * * *